(12) United States Patent
Hernandez et al.

(10) Patent No.: US 9,055,467 B2
(45) Date of Patent: Jun. 9, 2015

(54) SENDER DEVICE BASED PAUSE SYSTEM

(71) Applicant: Dell Products L.P., Round Rock, TX (US)

(72) Inventors: Hendrich M. Hernandez, Round Rock, TX (US); Robert Lee Winter, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 13/740,602

(22) Filed: Jan. 14, 2013

(65) Prior Publication Data

US 2014/0198646 A1    Jul. 17, 2014

(51) Int. Cl.
*H04W 28/02* (2009.01)
*H04L 12/825* (2013.01)
*H04W 28/10* (2009.01)

(52) U.S. Cl.
CPC .......... *H04W 28/0257* (2013.01); *H04W 28/10* (2013.01); *H04L 47/266* (2013.01)

(58) Field of Classification Search
USPC ................. 370/229–232, 235, 236
See application file for complete search history.

(56) References Cited

U.S. PATENT DOCUMENTS

| | | | | |
|---|---|---|---|---|
| 6,222,825 B1* | 4/2001 | Mangin et al. | ................ | 370/235 |
| 2003/0210651 A1* | 11/2003 | Tzeng et al. | ................ | 370/231 |
| 2009/0010161 A1* | 1/2009 | Zhang et al. | ................ | 370/235 |
| 2012/0287790 A1* | 11/2012 | Huang et al. | ................ | 370/236 |
| 2013/0272121 A1* | 10/2013 | Stanwood et al. | ............ | 370/230 |

* cited by examiner

*Primary Examiner* — Kerri Rose
(74) *Attorney, Agent, or Firm* — Haynes and Boone, LLP

(57) ABSTRACT

A network communication pause system includes a network interface device and a management controller. The management controller is operable to monitor first data traffic that is received by the network interface device over a network and that is associated with a sender Media Access Control (MAC) address and a receiver MAC address. If the management controller determines that the first data traffic has exceeded a threshold, a pause frame that includes the sender MAC address is sent over the network through the network interface device to a sender device associated with the sender MAC address. The pause frame may include an operations code that causes intermediate devices coupled between the management controller and the sender device to forward the pause frame to the sender device, and a pause time for which the sender device will pause the sending of data traffic to the receiver MAC address.

20 Claims, 5 Drawing Sheets

SENDER DEVICE BASED PAUSE SYSTEM

BACKGROUND

The present disclosure relates generally to information handling systems, and more particularly to a sender device based pause system for controlling communications between information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, a server IHS, may include a network interface device (e.g., a network interface controller (NIC), a Local Area Network (LAN) on Motherboard (LOM), etc.) that provides an Ethernet interface between a network and IHS components in the server IHS. However, IHS components in the server IHS may include different maximum transmission rates to communicate with the network interface device. For example, a 10 GB Ethernet (GE) LOM that provides the Ethernet interface may be shared by a Baseboard Management Controller (BMC) that communicates with the LOM at a maximum transmission rate of 100 MB/second, and server operating system (OS) applications that communicate with the LOM at a maximum transmission rate of 10 GB/second. In a high traffic situation, such a scenario can raise a number of issues. For example, in the event the BMC receives more data than it is capable of processing, a link-based pause Ethernet frame is generated and sent to the LOM. In response, the LOM stops all data from passing through the LOM until the BMC is capable of processing additional data. This prevents the server OS applications from receiving data through the LOM, and thus communicating through the network, even though the server OS applications may be capable of processing data (i.e., because the server OS applications may be well under their maximum transmission rate with the LOM.)

Accordingly, it would be desirable to provide an improved pause system for IHS communications.

SUMMARY

According to one embodiment, a network communication pause system includes a network interface device that is operable to couple to a network; and a management controller coupled to the network interface device, wherein the management controller is operable to: monitor first data traffic that is received by the network interface device and that is associated with a sender Media Access Control (MAC) address and a receiver MAC address; determine that the first data traffic has exceeded a threshold; and send a pause frame that includes the sender MAC address over the network through the network interface device to a sender device associated with the sender MAC address.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
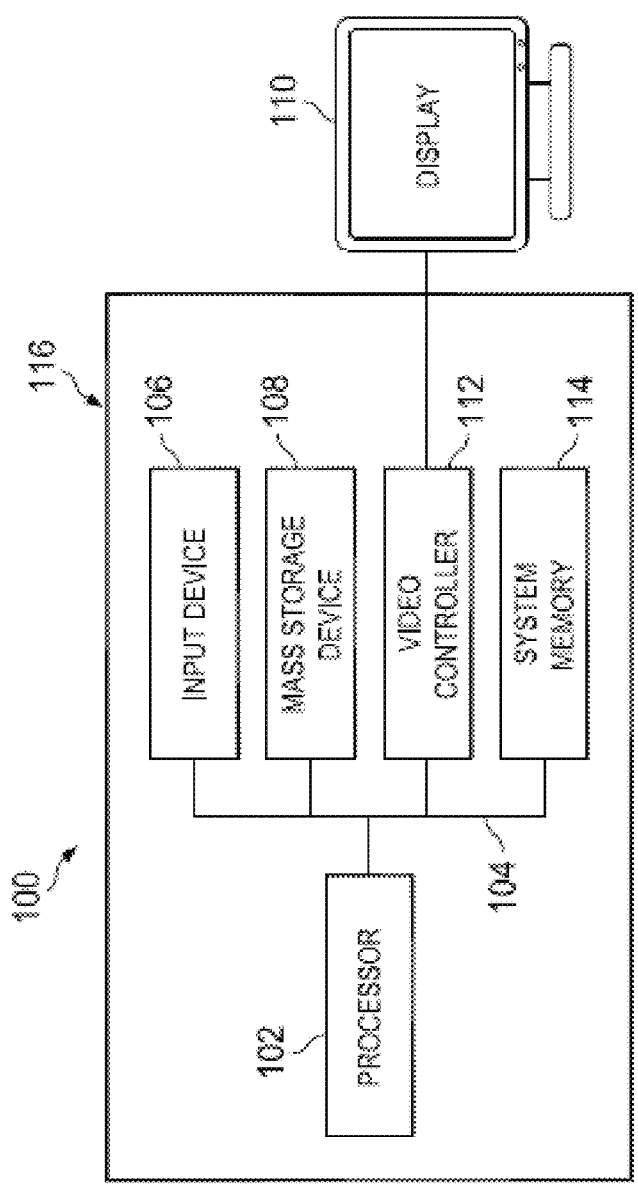
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
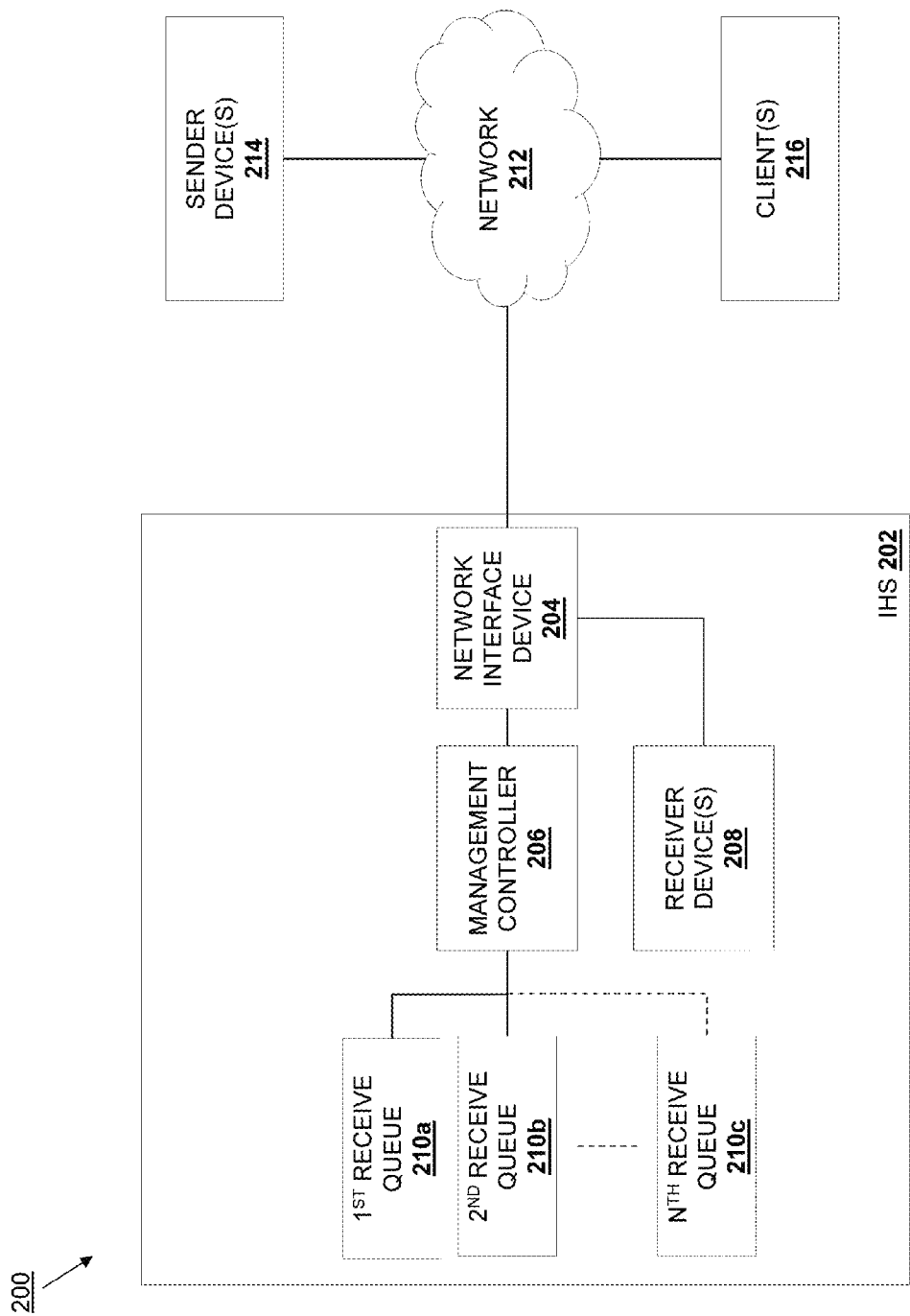
FIG. 2 is a schematic view illustrating an embodiment of a network communications pause system.

Referring now to FIG. 2, an embodiment of a network communications pause system 200 is illustrated. The network communications pause system 200 includes an IHS 202 which may be, for example, the IHS 100 and/or include some or all of the IHS components of the IHS 100, discussed above with reference to FIG. 1. In the examples discussed below, the IHS 202 is a server IHS, but one of skill in the art will recognize that the IHS may be client IHSs, workstation IHSs, and/or a variety of other types of IHSs known in the art without departing from the scope of the present disclosure. The IHS 200 includes a network interface device 204. In the examples discussed below, the network interface device 204 is a 10 Gigabit Ethernet (GE) Local Area Network (LAN) on motherboard (LOM), but in other embodiments may include a Network Interface Controller (NIC), a Network Daughter Card (NDC), and/or a variety of other network interface devices known in the art. The network interface device 204 is coupled to a management controller 206. In the examples discussed below, the management controller 206 is a baseboard management controller (BMC), but the functions performed by the BMC discussed below may be performed by any endpoint device that has the potential to be consumed by data traffic sent from sender devices, any management device monitoring data traffic sent to endpoint devices that have the potential to be consumed by data traffic sent from sender devices, and/or a variety of other devices known in the art. The network interface device 204 is also coupled to one or more receiver devices 208 that are associated with one or more Media Access Control (MAC) addresses. In one example, the network interface device 208 connects through a bus (e.g., a Peripheral Component Interface express (PCIe) or other buses known the art) to a memory device that includes instructions that, when executed by a processor, cause the processor to provide an operating system (OS) with OS applications. Thus, in the examples discussed herein referring to OS applications, those OS applications may be provided by a receiver device 208 that includes a memory device with a MAC address associated with those OS applications. Furthermore, in some embodiments, the management controller 206 may be a receiver device.

As illustrated in FIG. 2, the network interface device 204 is operable to couple the IHS 202 to the network 212. The network 212 may include a LAN, the Internet, and/or a variety of other networks known in the art. One or more sender devices 214 and one or more client devices 216 may be coupled to the network 212 and operable to communicate with the IHS 202 over the network, as discussed in further detail below. Each of the one or more sender devices 214 and the one or more client devices 216 may be associated with sender device MAC addresses and client device MAC addresses, respectively. In the examples discussed below, the one or more sender devices 214 may include a management console such as, for example, a Dell® Management Console, a Dell® KACE Management Appliance, a Dell® OpenManage™ Essentials Console, all available from the assignee of this disclosure, Dell Computers Inc., and/or a variety of other management consoles known in the art. Furthermore, the sender devices 214 may also include a Fiber Channel Storage Array, an Internet Small Computer System Interface (iSCSI) Storage Array, and/or a variety of other sender devices known in the art. In an embodiment, the one or more client devices 216 may include a personal computer (PC) IHS, a laptop/notebook IHS, a workstation IHS, a mobile IHS (e.g., a phone IHS, tablet IHS, or other mobile IHS known in the art), a thin client IHS, and/or a variety of other client devices known in the art. As discussed in further detail below, the management controller 206 may create receive queues such as a first receive queue 210a, a second receive queue 210b, and up to an $N^{th}$ receive queue 210c to monitor data traffic sent from sender MAC addresses that are associated with the one or more sender device 214 that are coupled to a network 212.

In one particular example, the IHS 202 is a server IHS that includes a 10 GE LOM (the network interface device 204) that is shared by a BMC (the management controller 206) associated with a BMC MAC address and server OS applications or other receivers of general server traffic (one of the receiver devices 208) that are associated with receiver MAC addresses. The BMC is coupled to the 10 GE LOM through a communications bus and includes a maximum rated transmission rate of 100 Mb/s with the 10 GE LOM, and the server OS applications is/are coupled to the 10 GE LOM through a communications bus and includes a maximum rated transmission rate of 10 Gb/s with the 10 GE LOM. The 10 GE LOM couples the server IHS to a LAN (the network 212) and is operable to communicate over the LAN at a maximum transmission rate of 10 Gb/s to receive data traffic from at least a management console (one of the sender device 214) that is addressed to the BMC. As discussed above, convention systems including such a configuration will not efficiently use the shared 10 GE LOM due to the differences in the maximum transmissions rates of the BMC and the server OS applications. For example, the 10 GE LOM is capable of receiving data traffic for the BMC at 10 GB/s, which is much faster than the 100 Mb/s the BMC can receive that data traffic, and the management console may create a high data traffic situations by providing the BMC data traffic at over 100 Mb/s (its maximum transmission rate), resulting in the generation of a conventional link-based pause that stops all data traffic to both the BMC and the server OS applications by stopping transmission of data traffic on either side of the link between the server IHS and a switch connecting the server IHS to the network 212 (i.e., a link level port-to-port pause). This conventional link-based pause will operate to stop data traffic into the server IHS until the BMC is capable of receiving more data traffic from the management console. Thus, the BMC, with its lower maximum transmission rate, will stop the server OS applications, with their higher maximum transmission rate, from receiving data traffic even though, in most cases, the server OS applications are capable of handling that data traffic.

Figure 3:
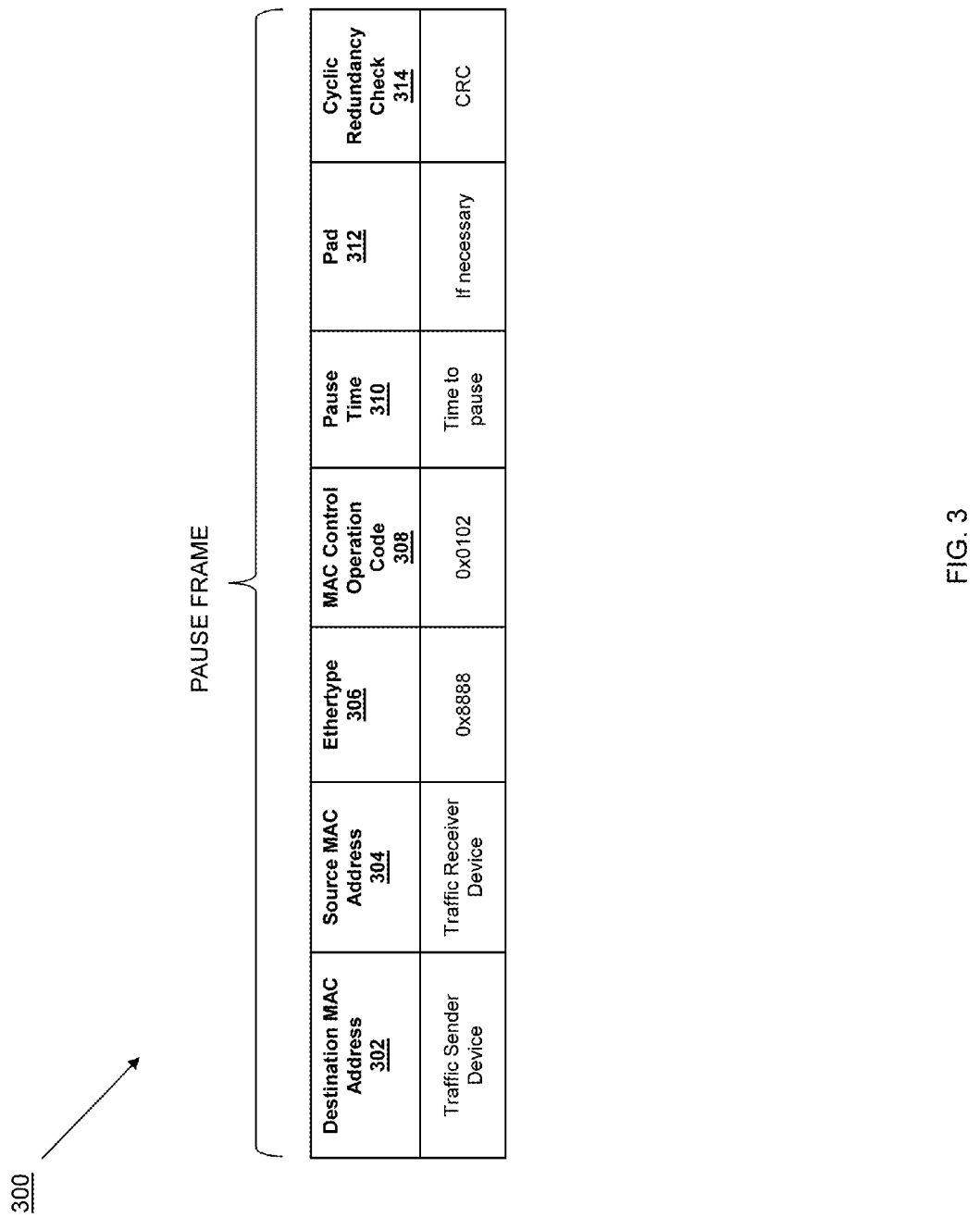
FIG. 3 is a chart view illustrating an embodiment of a pause frame.

Referring now to FIG. 3, an embodiment of a pause frame 30, which may be used in the network communications pause system 200 of FIG. 2, is illustrated that remedies the deficiencies of conventional systems discussed above. The pause frame 300 includes a destination MAC address 302 that includes information describing the sender device responsible for producing the data traffic at a rate that has exceeded a threshold, discussed in further detail below. The pause frame 300 also includes a source MAC address 304 that includes information describing the sender of the pause frame, which in the illustrated embodiment is information describing the receiver device that is receiving data traffic at a rate that has exceeded the threshold (e.g., a BMC that is receiving data traffic at a rate higher than its maximum transmission rate with a network interface device and that is monitoring data traffic received through a network interface device), but in other embodiments may include information about a receiver device 208 that has had its maximum transmission rate exceeded as monitored by a device monitoring data traffic received through a network interface device (e.g., the management controller 206). The pause frame 300 also includes an Ethertype 306 that includes information about the protocol encapsulated in the pause frame 300 (e.g., "0x8888" in the illustrated embodiment.) The pause frame 300 also includes a MAC control operation code 308 that specifies the pause operation of the present disclosure. One of skill in the art will recognize that the MAC control operation code of the illustrated embodiment, "0x0102" differs from the conventional MAC control operation code "0x0001", which is used to specify a pause operation in a pause frame is sent to a reserved multicast destination MAC address of "01.80.C2.00.00.01" that is not the MAC address of the sender device responsible for producing the data traffic that is causing the pause frame to be sent. As discussed in further detail below, the MAC control operation code of the present disclosure causes the pause frame 300 to be sent to the sender device responsible for producing the data traffic that is causing the pause frame to be sent. The pause frame 300 also includes a pad 312 that may be used to lengthen the data field of the pause frame 300 to a minimum size (e.g., 46 octets), and a cyclic redundancy check 314 that may be used to check for errors, as is known in the art.

Figure 4:
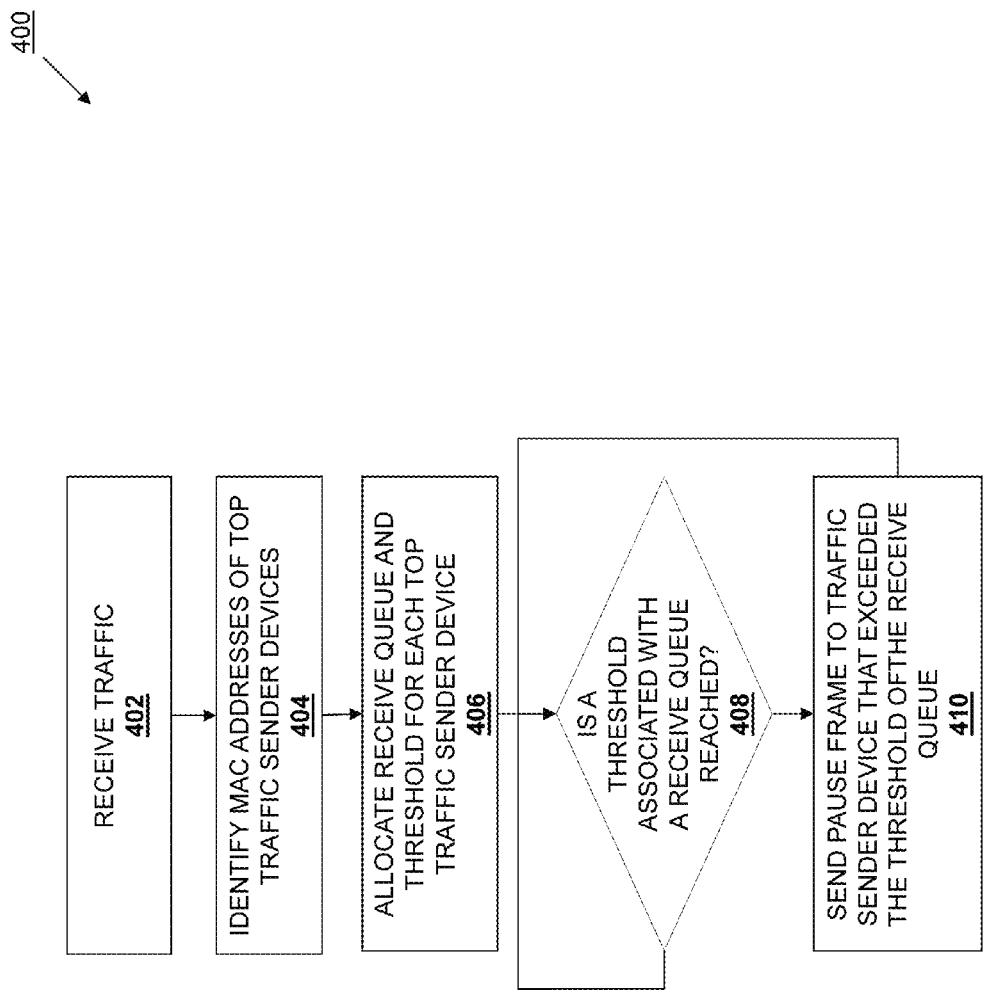
FIG. 4 is a flow chart illustrating an embodiment of a method for pausing network communications.

Referring now to FIG. 4, a method 400 for pausing network communications is illustrated. The method 400 is discussed with reference to the network communication pause system 200 illustrated in FIG. 2, and specifically with regard to the communications chart 500 illustrated in FIG. 5 that illustrates a particular embodiment in which one of the sender devices 214 is sending communications over the network 212 to the IHS 202 that are addressed to a first MAC address 502. However, one of skill in the art will recognize that the method 400 may be performed in a variety of other communications scenarios known in the art while remaining within the scope of the present disclosure. The method 400 begins at block 402 where traffic is received. In an embodiment, a plurality of data traffic may be received over the network 212 by the IHS 202 through the network interface device 204. For example, any of the sender devices 214 and the client devices 216 may send data traffic over the network 212 to the IHS 202, with data traffic sent from any particular device being associated with a receiver MAC address to which that data traffic is being sent (e.g., a receiver MAC address of one of the receiver devices 208), a sender MAC address from which that data traffic is being sent (e.g., a receiver MAC address of one of the receiver devices 208), and/or a variety of other data traffic information known in the art. Thus, in an embodiment of block 402, a first sender device 214 may send first data traffic over the network 212 to the IHS 202 that is addressed to a first sender MAC address, a second sender device 214 may send second data traffic over the network 202 to the IHS 202 that is addressed to the first sender MAC address, a second sender MAC address, or other sender MAC addresses, and so on. Furthermore, at block 402, the network interface device 204 receives the traffic.

The method 400 then proceeds to block 404 where MAC addresses of top traffic sender devices are identified. In an embodiment, the receiving of traffic from the network 212 by the network interface device 204 is monitored by the management controller 206. As discussed above, data traffic received over the network 212 includes a sender MAC address and a receiver MAC address, and at block 404, the management controller 206 may monitor the data traffic received by the network interface device 204 to identify the sender MAC addresses that are associated with that data traffic. In one example of block 404, the management controller 206 may identify the sender MAC addresses that are associated with the majority of the data traffic received at the network interface device 204 (e.g., a first sender MAC address may be associated with 30% of the data traffic, a second sender MAC address may be associated with 10% of the data traffic, a third sender MAC address may be associated with 6% of the data traffic, and a fourth MAC address may be associated with 5% of the data traffic, resulting in the first, second, third, and fourth MAC addresses being associated with 51% of the data traffic.) In another example of block 404, the management controller 206 may identify the sender MAC addresses that are associated with a minimum amount of data traffic received at the network interface device 204 (e.g., the management controller 206 may identify any sender MAC address that is associated with more than 10% of the data traffic.) In another example of block 404, the management controller 206 may monitor received data traffic counters (e.g., packet counters, total bytes received, etc.) to identify the sender MAC addresses that are associated with the majority of the data traffic received at the network interface device 204. For example, packet counters may indicate how much queue depth will be consumed, while total bytes received will indicate how receive buffers are filled. While a few examples of the identification of the top traffic sender devices have been provided, one of skill in the art will recognize that a variety of criteria may be used to determine the top traffic sender devices while remaining within the scope of the present disclosure.

Figure 5:
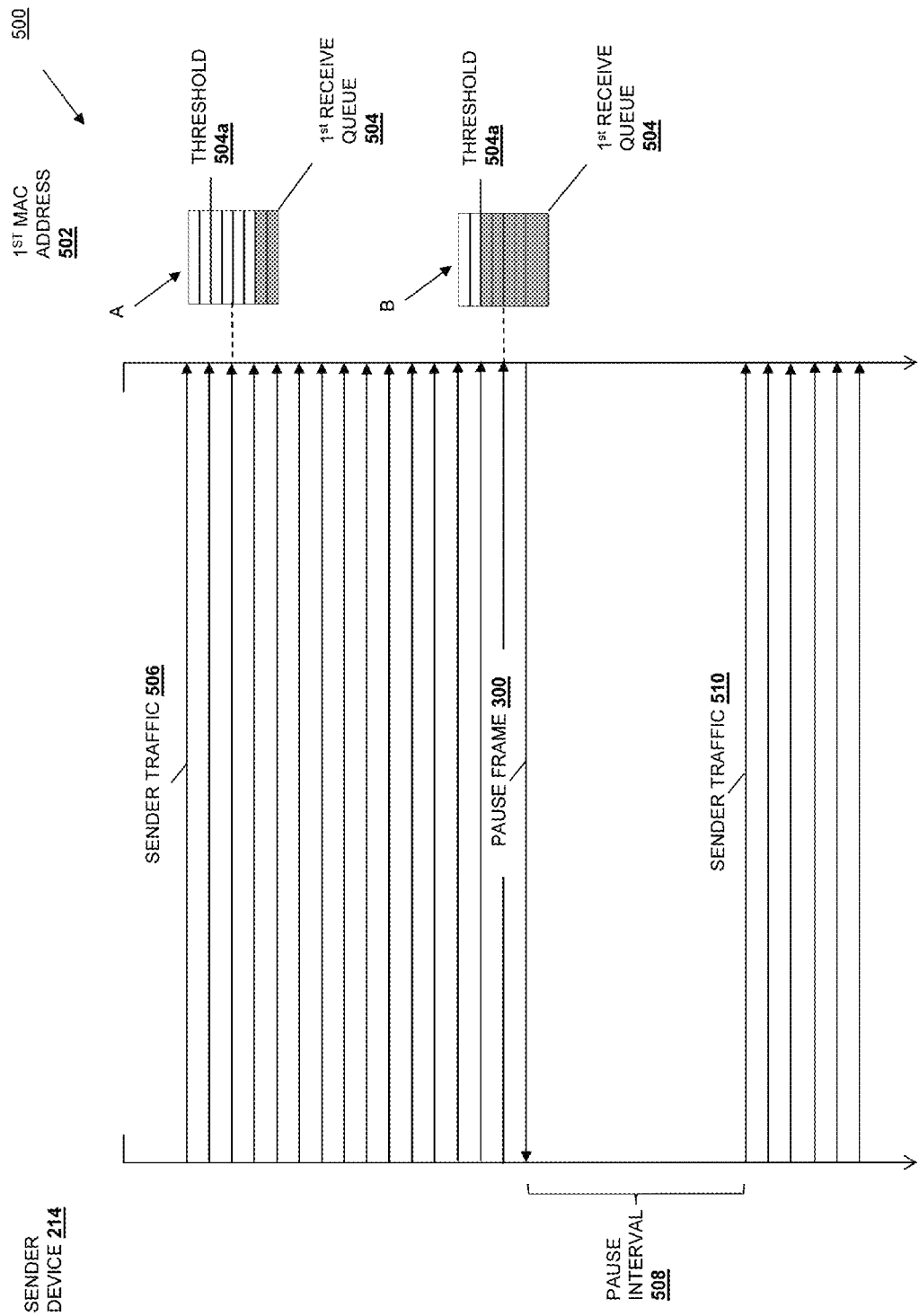
FIG. 5 is a chart view illustrating an embodiment of the communications occurring during the method of FIG. 4.

The method 400 then proceeds to block 406 where a receive queue and threshold is allocated for each top traffic sender device. In an embodiment, at block 406, the management controller 206 may allocate a receive queue and threshold for each of the top traffic sender device identified at block 404. For example, a BMC/management controller 206 may allocate a separate hardware receive queue on the BMC for each of the top traffic sender devices, or allocate its available hardware receive queues to the top traffic sender devices. In an embodiment, the threshold that is associated with the receive queue allocated to a top traffic sender device may be selected based on the receiver MAC address to which that sender device is sending data traffic. For example, if a first receiver MAC address to which a top traffic sender device is sending data traffic is associated with a receiver device 208 that communicates with the network interface controller 204 at a first maximum transmission rate, the threshold may be selected based upon that first maximum transmission rate. FIG. 5 illustrates a first receive queue 504 that was allocated to the sender device 214 (e.g., after it was determined to be a top traffic sender device) and associated with a threshold 504a that may have been selected based on the first MAC address 502 (or more specifically, the receiver device associated with that first MAC address and/or its ability to receive data traffic). In another embodiment, thresholds associated with receive queues may be selected based on bytes received, packets received, and/or a variety of other threshold criteria known in the art. In an embodiment, thresholds may be set such that the buffer or queue does not overflow before processing of pause frames can be performed (e.g., a few entries before the top of the queue.)

Thus, the management controller 206 may create a plurality of different receive queues (e.g., the first receive queue 210a, the second receive queue 210b, and up to the $N^{th}$ receive queue 210c, illustrated in FIG. 2) for the top data traffic sender devices, and associate a threshold with each of those receive queues that may be based on the receiver device/communication abilities of the receiver device/etc. to which each sender device is sending traffic. The management controller 206 may periodically return to blocks 402, 404, and 406 to re-identify the MAC addresses of the top traffic sender devices of received data traffic such that receive queues can be reallocated as the top traffic sender devices change. Returning to the specific embodiment discussed above, a BMC may identify the MAC address of a management console that is a top traffic sender device due to an amount of data traffic sent from the management console to the BMC, and in response the BMC may allocate a hardware receive queue to the MAC address of the management console while associating a threshold to that receive queue that is based on the maximum transmission rate between the BMC and the 10 GE LOM of 100 Mb/s.

The method 400 then proceeds to decision block 408 where it is determined whether a threshold associated with a receive queue is reached. In an embodiment, the management controller 206 monitors the data traffic received over the network 212 through the network interface device 204 with reference to the receive queues allocated at block 406 to determine whether a threshold associated with any receive queue is reached. For example, the first receive queue 210a may have been allocated in response to data traffic associated with a first sender MAC address being one of the top sources of data traffic received by the network interface device 204, the second receive queue 210b may have been allocated in response to data traffic associated with a second sender MAC address being one of the top sources of data traffic received by the network interface device 204, and so on. At decision block 408, as data traffic is received at the network interface device 204, the management controller 206 may retrieve the sender MAC address (e.g., a source MAC address in a packet frame) from first data traffic and determine if that sender MAC address was allocated a receive queue. If that sender MAC address was allocated a receive queue, that first data traffic may be added to the receive queue, while if that sender MAC address was not allocated a receive queue, the management controller 206 may send that first data traffic to its destination and then retrieve a sender MAC address from second data traffic, and so on. Thus, data traffic received through the network interface device 204 is reviewed by the management controller 206 and added to receive queues if those receive queues were allocated to a sender MAC address of that data traffic.

FIG. 5 illustrates a sender device 214, which in this embodiment is a top traffic sender device that was allocated a first receive queue 504 including an associated threshold 504a, sending sender data traffic 506 over the network 212 that is addressed to a first MAC address 502 in the IHS 202. As discussed above, the network interface device 204 receives the sender data traffic 506 and the management controller 206 determines that the sender data traffic 506 is associated with the first receive queue 504 (due to that sender data traffic including a sender MAC address for which the first receive queue 504 was created) and adds the sender data traffic 506 to the first receive queue 504. As illustrated in FIG. 5, at time A, the first receive queue 504 includes sender data traffic below the threshold 504a. However, as the sender device 214 continues to send the sender data traffic 506, and the management controller 206 adds that sender data traffic 506 to the first receive queue 405 until the threshold 504a is reached at a time B. Thus, at time B and decision block 408, the management controller 206 will determine that a threshold associated with a receive queue (the threshold 504a associated with the receive queue 504 in the illustrated embodiment) has been reached, and the method 400 will proceed to block 410. If at decision block 408 it is determined that a threshold associated with a receive queue has not been reached (e.g., the first receive queue 504 prior to time B in the illustrated embodiment), the method 400 returns to decision block 408 to determine whether a threshold associated with a receive queue has been reached. Thus, the method 400 will continue to monitor receive queues for reached threshold until a threshold is reached, and as discussed above for some embodiments, may periodically reallocate receive queues to the MAC addresses of the top traffic sender devices as the identities of those top traffic sender devices change.

At block 410, a pause frame is sent to the sender device that sent data traffic that caused the threshold of a receive queue to be exceeded. In an embodiment, at block 410, the management controller 206 sends a pause frame 300, discussed above with reference to FIG. 3, to the network interface device 204. As discussed above with reference to FIG. 3, the pause frame 300 will include a destination MAC address 302 of the sender device 214 that caused the threshold 504a of the receive queue 504 to be exceeded (which is also the sender MAC address of the sender data traffic 506), a source MAC address 304 of the receiver device 208 (which in this embodiment is also the first MAC address 502), a MAC control operation code 308 that causes the pause frame 300 to be forwarded to the sender device 214 having the destination MAC address 302 (which in this embodiment is "0x0102), and a pause time 310 that includes a time period during which the sender device 214 is instructed to pause sending the sender data traffic 506 to the management controller 206.

Returning to the specific embodiment discussed above, the management console sending data traffic to the BMC may be a top traffic sender device that has a receive queue allocated to it and a threshold associated with that receive queue by the BMC, as discussed above. When the management console sends data traffic to the BMC such that the threshold associated with the receive queue is exceeded, the BMC responds by sending a pause frame to the management console that includes the MAC address of the management console, the MAC address of the BMC, a MAC control operation code of "0x0102", and a pause time that will allow the BMC to process the data traffic in the receive queue such that the receive queue is below its threshold and the management console may resume sending data traffic.

At block 410, the management controller 206 sends the pause frame 300 to the network interface device 204. The MAC control operation code 308 (e.g., "0x0102") and the destination MAC address 302 (e.g., the MAC address of the sender device 214 that caused the threshold 504a of the first receive queue 504 to be exceeded) cause the network interface device 204 to forward the pause frame over the network 212 to the sender device 214 associated with the destination MAC address 302. Furthermore, the MAC control operation code 308 and the destination MAC address 302 in the pause frame 300 will cause any intermediate devices between the network interface device 204 and the sender device 214 (or between the management controller 206 and the network interface device 204) to forward the pause frame to the sender device 214 associated with the destination MAC address 302. Thus, at block 410, the pause frame 300 is received by the sender device 214 that caused the threshold 504a of the receive queue 504 to be exceeded at decision block 408. In response to receiving that pause frame 300, the destination MAC address 302 (which is the MAC address of that sender device 214?) and the pause time 310 will cause the sender device 214 to pause the sending of the sender data traffic 506 to the first MAC address 502 for a pause interval 508, as illustrated in FIG. 5. As further illustrated in FIG. 5, following the pause interval 508, the sender device 214 may resume sending sender data traffic 510 (which may be related to the sender data traffic 506) to the first MAC address 502, and the method 400 may repeat.

Returning to the specific embodiment discussed above, the BMC generates the pause frame in response to the management console sending data traffic that exceeds a threshold in a receive queue allocated to the management console in the BMC. That pause frame is received by the 10 GE LOM and forwarded over the LAN to the management console due to the pause frame including the destination MAC address of the management console and a MAC control operation code of "0x0102". That pause frame is received by the management console and causes the management console to pause the sending of data traffic for the pause interval, which may be selected (e.g., as the pause time 310 in the pause frame 300) based on the 100 Mb/s maximum transmission rate of the BMC to the 10 GE LOM (i.e., that pause interval may allow the BMC to process the data traffic at its maximum transmission rate such that the data traffic in the receive queue allocated to the management console is reduced to below its associated threshold.) Following the pause interval, the management console may resume sending data traffic to the BMC.

Thus, systems and methods have been described that monitor data traffic sent from sender devices to receiver devices in an IHS to determine whether any of that data traffic exceeds a threshold associated with at least one of the sender devices. In the event a threshold is exceeded, a pause frame is generated that is directed to the sender device that is sending data traffic that exceeds the threshold, that will be forwarded by intermediate devices to that sender device, and that causes that sender device to pause the sending of data traffic for a pause time/interval so that the receiver device to which that data traffic is addressed can process the data traffic. While the sender device is pausing the sending of data traffic to the receiver device, other receiver devices in the IHS may continue to receive data traffic (as the pause is performed by the specific sender device that is causing the threshold to be exceeded, and not by a device that allows all data traffic to enter the IHS.) These systems and methods may be useful, for example, in IHSs that include receiver devices that share a network interface device but communicate with that network interface device at different maximum transmission rates. When the receiver device that communicates with the network interface device at a lower maximum transmission rate is overloaded (e.g., data traffic sent to that receiver device exceeds the maximum transmission rate between that receiver device and the network interface device), the sender device sending that data traffic will pause sending that data traffic, while the other receiver device(s) with higher maximum transmission rate(s) with the network interface device will continue to receive data traffic.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network communication pause system, comprising:
   a chassis;
   a network interface device that is housed in the chassis and configured to couple to a network;
   a plurality of receiver devices that are housed in the chassis and coupled to the network interface device; and
   a management controller that is coupled to the network interface device, wherein the management controller is configured to:
     monitor a plurality of data traffic that is received by the network interface device and that includes first data traffic that is received from a first sender device that is coupled to the network and that is directed to a first receiver device of the plurality of receiver devices;
     determine that the first data traffic has exceeded a threshold associated with the first receiver device; and
     send a pause frame over the network through the network interface device to the first sender device, wherein the pause frame includes an address of the first sender device and an operations code that causes intermediate devices coupled between the management controller and the first sender device to forward the pause frame to the address of the first sender device, and wherein the pause frame is configured to cause the first sender device to pause sending the first data traffic to the first receiver device while second data traffic included in the plurality of data traffic continues to be received by the network interface device from at least one second sender device that is coupled to the network and provided to at least one second receiver device of the plurality of receiver devices.

2. The network communication pause system of claim 1, wherein the management controller is configured to:
   determine that the first sender device is at least one top traffic sender device of the plurality of data traffic received by the network interface device.

3. The network communication pause system of claim 1, wherein the management controller is configured to:
   allocate a receive queue to the first data traffic, wherein the threshold is associated with the receive queue.

4. The network communication pause system of claim 1, wherein the address of the first sender device is a Media Access Control (MAC) address and the operations code is a MAC control operations code.

5. The network communication pause system of claim 1, wherein the pause frame includes a pause time for which the first sender device will pause the sending of the first data traffic to the first receiver device.

6. The network communication pause system of claim 1, wherein a first transmission rate between the first receiver device and the network interface device is less than a second transmission rate between the at least one second receiver device and the network interface device.

7. The network communication pause system of claim 1, wherein a transmission rate between the management controller and the network interface device is less than a transmission rate between the network interface device and the network.

8. An information handling system (IHS), comprising:
   a chassis;
   a processor that is located in the chassis;
   a memory that is located in the chassis and coupled to the processor;
   a network interface device that is located in the chassis and coupled the processor, wherein the network interface device is configured to couple to a network;
   a plurality of receiver devices that are located in the chassis and that are coupled to the network interface device; and
   a management controller that is coupled to the network interface device, wherein the management controller is configured to:
     monitor a plurality of data traffic that is received by the network interface device from a plurality of sender Media Access Control (MAC) addresses and addressed to a plurality of receiver MAC addresses of the plurality of receiver devices;
     determine that first data traffic of the plurality of data traffic that is received from a first sender MAC address of the plurality of sender MAC addresses and addressed to a first receiver MAC address of the plurality of receiver MAC addresses has exceeded a threshold that is associated with a first receiver device of the plurality of receiver devices that includes the first receiver MAC address; and send a pause frame that includes the first sender MAC address and a MAC control operations code over the network through the network interface device, wherein the MAC control operations code in the pause frame is configured to cause intermediate devices coupled to the management controller to forward the pause frame to the first sender MAC address, and wherein the pause frame is configured to cause the sending the first data traffic from the first sender MAC address to the first receiver MAC address to be paused while second data traffic included in the plurality of data traffic continues to be received by the network interface device over the network from at least one second sender MAC address and provided to at least one second receiver device of the plurality of receiver devices.

9. The IHS of claim 8, wherein the management controller is configured to:

determine that the first sender MAC address sending the first data traffic is at least one top traffic sending MAC address of data traffic received by the network interface device.

10. The IHS of claim 8, wherein the management controller is configured to:

allocated a receive queue to the first data traffic, wherein the threshold is associated with the receive queue.

11. The IHS of claim 8, wherein the intermediate devices are coupled between the management controller and a first sender device that includes the first sender MAC address.

12. The IHS of claim 8, wherein the pause frame includes a pause time for which the sending of data traffic from the first sender MAC address to the first receiver MAC address will be paused.

13. The IHS of claim 8, wherein a first transmission rate between the first receiver device and the network interface device is less than a second transmission rate between the at least one second receiver device and the network interface device.

14. The IHS of claim 8, wherein a transmission rate between the management controller and the network interface device is less than a transmission rate between the network interface device and the network.

15. A method for pausing network communications, comprising:

monitoring a plurality of data traffic that is received by a network interface device over a network and that includes first data traffic from a first sender device that is directed to a first receiver device of a plurality of receiver devices, wherein the network interface device and the plurality of receiver devices are included in a chassis;

determining that the first data traffic has exceeded a threshold associated with the first receiver device;

sending a pause frame to the first sender device over the network through the network interface device, wherein the pause frame includes an operations code that causes intermediate devices coupled between the network interface device and the first sender device to forward the pause frame to the first sender device, and causes the first sender device to pause sending the first data traffic to the first receiver device; and receiving second data traffic of the plurality of data traffic by the network interface device from at least one second sender device over the network and providing the second data traffic to at least one second receiver device of the plurality of receiver devices while the sending of the first data traffic is paused.

16. The method of claim 15, further comprising:

determining that the first sender device is at least one top traffic sender device of the plurality of data traffic received by the network interface device.

17. The method of claim 15, further comprising:

allocating a receive queue to the first data traffic, wherein the threshold is associated with the receive queue.

18. The method of claim 15, wherein the operations code is a MAC control operations code.

19. The method of claim 15, wherein the pause frame includes a pause time for which the first sender device will pause the sending of first data traffic to the first receiver device.

20. The method of claim 15, wherein a first transmission rate between the first receiver device and the network interface device is less than a second transmission rate between a second receiver device and the network interface device.

* * * * *